No. 622,570. Patented Apr. 4, 1899.
G. C. VAUGHN.
APPARATUS FOR LEACHING.
(Application filed Jan. 12, 1898.)

(No Model.) 5 Sheets—Sheet 1.

WITNESSES
Matthew M. Blunt.
J. Murphy.

INVENTOR
George C. Vaughn
BY Jas. H. Churchill
ATTORNEY

No. 622,570. Patented Apr. 4, 1899.
G. C. VAUGHN.
APPARATUS FOR LEACHING.
(Application filed Jan. 12, 1898.)
(No Model.) 5 Sheets—Sheet 2.

WITNESSES
Matthew M. Blunt
J. Murphy

INVENTOR
George C. Vaughn
BY Jas. H. Churchill
ATTORNEY

No. 622,570. Patented Apr. 4, 1899.
G. C. VAUGHN.
APPARATUS FOR LEACHING.
(Application filed Jan. 12, 1898.)

(No Model.) 5 Sheets—Sheet 3.

WITNESSES
Matthew M. Blunt.
J. Murphy.

INVENTOR
George C. Vaughn
BY
Jas. H. Churchill
ATTORNEY

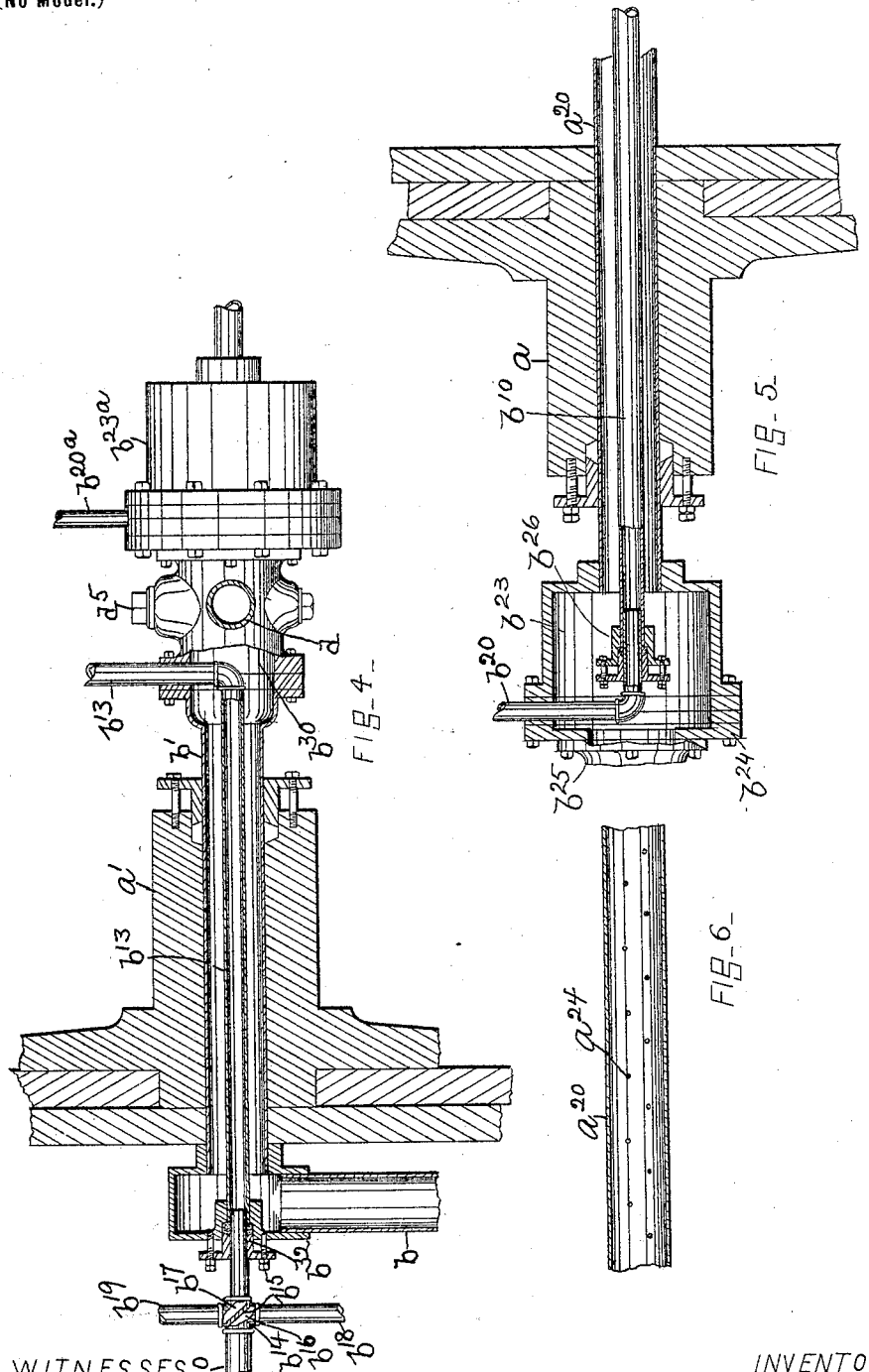

No. 622,570. Patented Apr. 4, 1899.
G. C. VAUGHN.
APPARATUS FOR LEACHING.
(Application filed Jan. 12, 1898.)

(No Model.) 5 Sheets—Sheet 5.

WITNESSES
Matthew M. Blunt.
J. Murphy.

INVENTOR
George C. Vaughn
BY
Jas. H. Churchill
ATTORNEY.

UNITED STATES PATENT OFFICE.

GEORGE C. VAUGHN, OF SALEM, MASSACHUSETTS, ASSIGNOR TO THE VAUGHN MACHINE COMPANY, OF PORTLAND, MAINE.

APPARATUS FOR LEACHING.

SPECIFICATION forming part of Letters Patent No. 622,570, dated April 4, 1899.

Application filed January 12, 1898. Serial No. 666,396. (No model.)

*To all whom it may concern:*

Be it known that I, GEORGE C. VAUGHN, a citizen of the United States, residing in Salem, in the county of Essex and State of Massachusetts, have invented an Improvement in Apparatus for Leaching, of which the following description, in connection with the accompanying drawings, is a specification, like letters on the drawings representing like parts.

This invention relates to an apparatus for leaching, especially designed and adapted for leaching tanbark, but which is also well adapted for leaching other materials, and to avoid repetition I shall hereinafter describe my invention with relation to the extract of tannin from tanbark.

My present invention has for its object to provide a method and apparatus for leaching tanbark, whereby a maximum amount of tannin may be extracted from the bark in a minimum time and at a minimum expense, as will be described.

In accordance with this invention the tanbark is agitated or put in motion, as will be described, and while in motion is subjected to the action of heat and water in a closed vessel or drum, which results in all or substantially all the tannin in the bark being extracted in a minimum time and at a minimum expense by the water as it descends or percolates through the mass of tanbark while the particles of bark are in motion. These and other features of this invention will be pointed out in the claims at the end of this specification.

Figure 1:
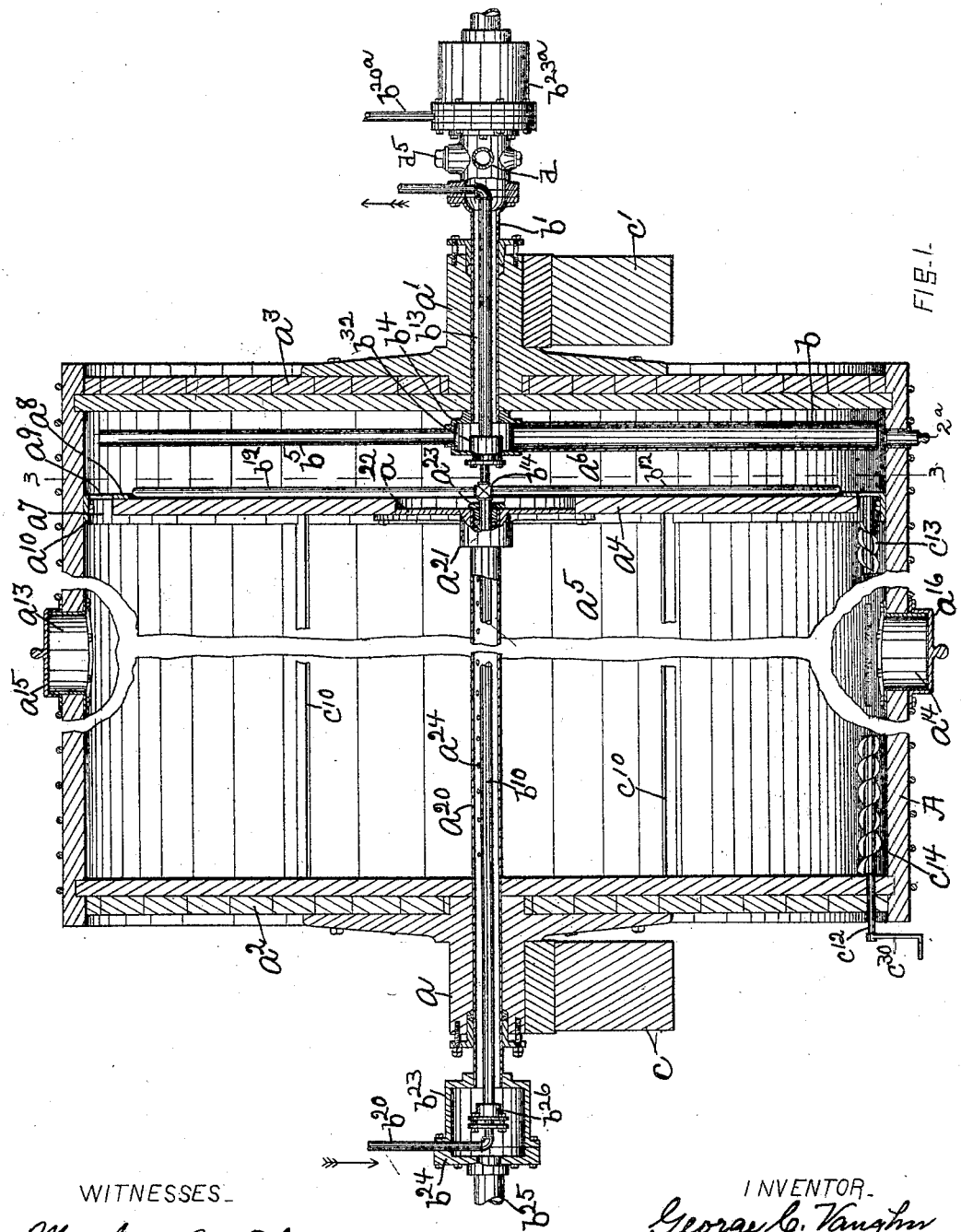
Figure 2:
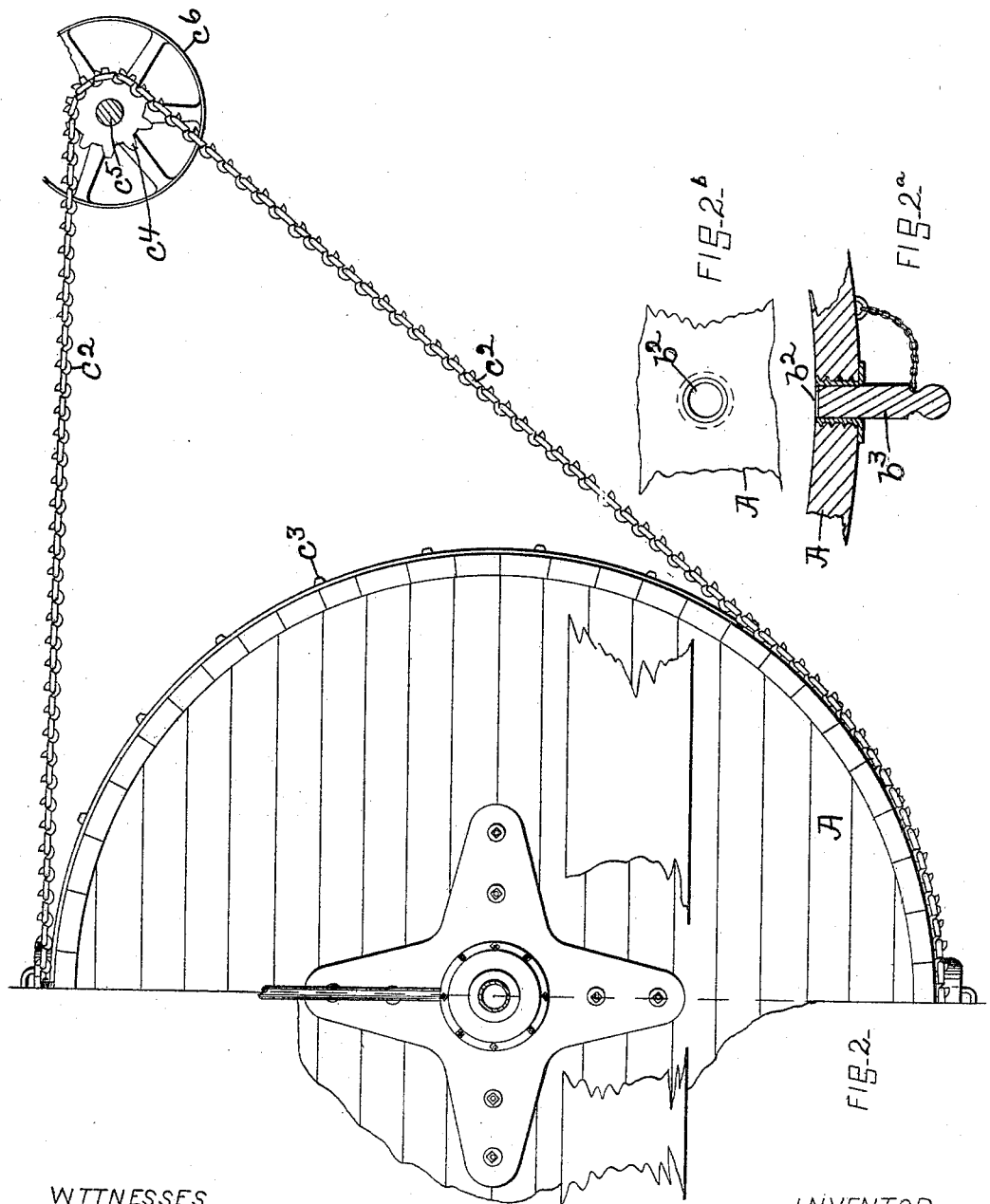
Figure 3:
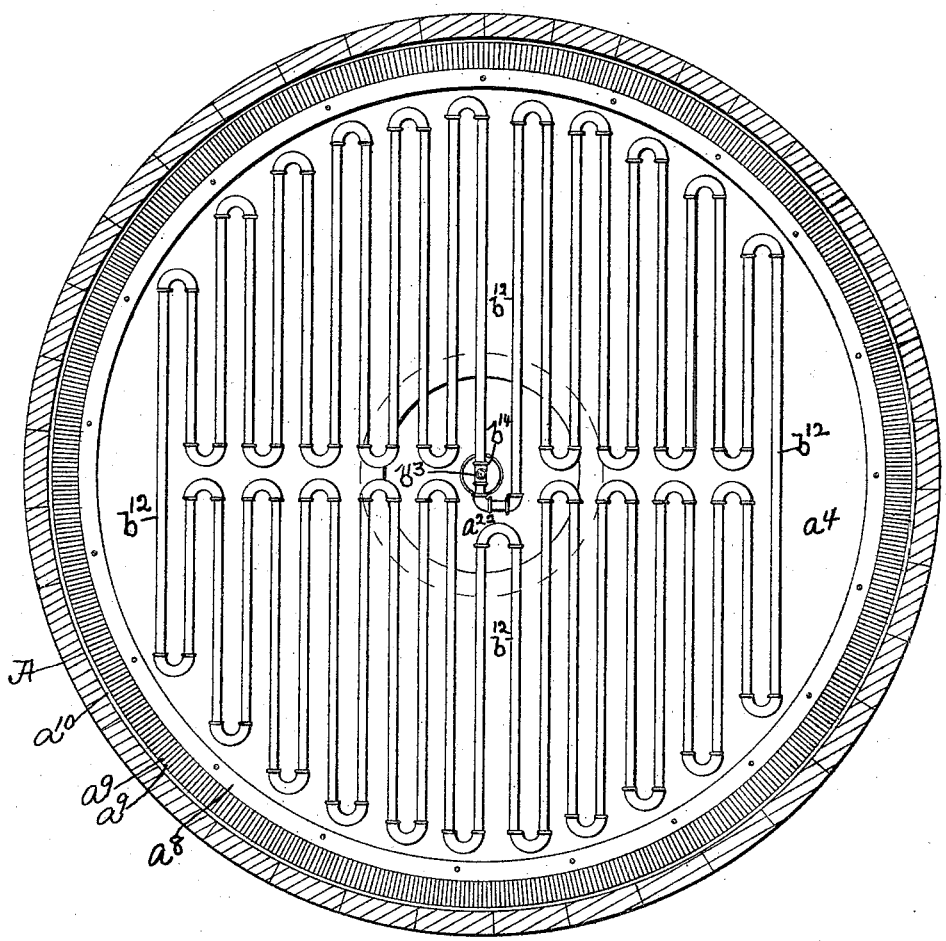

Figure 1 represents in section and elevation a single apparatus embodying this invention and with which my improved method may be practiced; Fig. 2, a side elevation of the apparatus shown in Fig. 1, looking toward the left, and also showing one manner of driving the drum; Figs. $2^a$ and $2^b$, details to be referred to; Fig. 3, a section on the line 3 3, Fig. 1, looking toward the left; Figs. 4, 5, and 6, details on an enlarged scale to be referred to; and Fig. 7, a plan view of a series of drums connected together to form a closed system, as will be described.

Referring to Fig. 1, A represents a rotatable normally-closed drum, tub, or vat in which the tanbark in a substantially fine or comminuted condition is placed. The drum A may be provided, as herein shown, with hollow trunnions $a$ $a'$, bolted or otherwise secured to the heads $a^2$ $a^3$ of the said drum. The drum A in the present instance is provided within it with a false head or partition-wall $a^4$, which forms within the drum two chambers $a^5$ $a^6$, which communicate together near the circumferential wall of the drum for the passage of the extract or percolated liquor from the bark-chamber $a^5$ into the chamber $a^6$, which may be designated the "liquor-chamber" or "hot-well." In the present instance the false head $a^4$ is shown as of less diameter than the drum, and the annular space $a^7$ between the circumference of the said head and the inner circumference of the drum is closed to the passage of the tanbark from the chamber $a^5$ into the chamber or hot-well $a^6$, but is not closed to the passage of liquor or extract from the chamber $a^5$ into the chamber $a^6$. The annular space $a^7$ may be closed by means of a strainer, shown as an annular plate or ring $a^8$, provided with slits or narrow slots $a^9$, and having a flange $a^{10}$, which is secured to the drum A. The strainer-plate $a^8$ may be secured to the false head $a^4$ in any suitable manner, and instead of the slitted plate any other form of strainer may be used—such, for instance, as wire-netting and perforated plates. The tanbark-chamber $a^5$ is provided, as herein shown, with an inlet-opening $a^{13}$ and with an outlet-opening $a^{14}$, located, as shown, substantially diametrically opposite to one another and normally closed liquid-tight by suitable covers $a^{15}$ $a^{16}$. The leaching-chamber $a^5$ is provided with a liquid-inlet, preferably made as herein shown, and consisting of a substantially large stationary pipe $a^{20}$, extended through the hollow trunnion $a$ and preferably across the chamber $a^5$, and through a hollow hub $a^{21}$ of an annular plate or disk $a^{22}$, which covers a substantially large manhole or opening in the false head $a^4$. The liquid-inlet or feed pipe $a^{20}$ is closed at its inner end, as by a suitable plug or cap $a^{23}$, and is provided with one or more outlet openings or perforations $a^{24}$, through which the water or other leaching liquor may pass into the leaching-chamber $a^5$.

The leaching liquor admitted into the chamber $a^5$ percolates through the tanbark, extracting the tannin therefrom, and flows through the strainer $a^8$ into the well or chamber $a^6$, from which it is adapted to find an outlet through a substantially vertical leg $b$ of a stationary outlet-pipe $b'$, extended through the hollow trunnion $a'$. The vertical leg $b$ of the liquid-outlet pipe extends to near the circumferential wall of the well or chamber $a^6$, and the latter is provided with an outlet $b^2$ through its circumferential wall, which is normally closed by a plug or valve $b^3$ (see Figs. 1, $2^a$, and $2^b$) and by which the liquor in the well $a^6$ may be drained off. The outlet-pipe $b'$ and its vertical leg $b$ are connected together within the well $a^6$, as herein shown, by a fitting $b^4$, (see Fig. 1,) to which may be connected a substantially vertical pipe $b^5$, forming a pressure-equalizing or vent pipe to avoid the leaching liquor being forced too rapidly through the tanbark by pressure.

To facilitate the leaching process, the tanbark and the leaching liquor are heated, which may be accomplished by means of a heating apparatus, preferably such as herein shown, and consisting of a steam-inlet pipe $b^{10}$, a steam-coil $b^{12}$, preferably located in the hot-well adjacent to the false head $a^4$, and a steam-outlet pipe $b^{13}$. The steam-inlet pipe $b^{10}$ is extended through the liquor-inlet pipe $a^{20}$, and is connected to a fitting or coupling $b^{14}$, divided by a partition-wall $b^{15}$ (see Fig. 4) to form two passages or chambers $b^{16}$ $b^{17}$, the inlet-pipe $b^{10}$ and one end $b^{18}$ of the coil being connected to the chamber $b^{16}$ and the other end $b^{19}$ of the said coil and the outlet-pipe $b^{13}$ being connected to the chamber $b^{17}$.

In practice a number of the leaching-drums A may and preferably will be connected in series, and the steam-inlet pipe $b^{10}$ of each drum is connected by a branch pipe $b^{20}$ to a main steam-supply pipe $b^{21}$. (See Fig. 7.) The branch pipe $b^{20}$ may and preferably will be connected to the inlet-pipe $b^{10}$ within an enlarged chamber $b^{23}$, provided with a removable head $b^{24}$, to which the main liquor-supply pipe $b^{25}$ for the drum is bolted or otherwise secured. The branch pipe $b^{20}$ may be inserted into the end of the steam-inlet pipe $b^{10}$ and be secured therein steam-tight by a stuffing-box $b^{26}$ of any suitable construction. (See Fig. 5.) The steam-outlet pipe $b^{13}$ also extends through an enlargement or chamber $b^{30}$ (see Fig. 4) in the liquor-outlet pipe $b'$ and is made in two sections, as shown in Fig. 4, which are rendered steam-tight by a stuffing-box $b^{32}$. (See Figs. 1 and 4.) This construction of the steam-pipe allows for contraction and expansion and permits the steam-coil to revolve with the drum.

The drum A is adapted to rotate on suitable supports $c$ $c'$ (see Fig. 1) by suitable mechanism, shown in the present instance as a sprocket-chain $c^2$, passed about the drum A, and engaging teeth or projections $c^3$ thereon, (see Fig. 2,) and about a sprocket-wheel $c^4$ on a driving-shaft $c^5$, provided, as shown, with a pulley $c^6$; but instead of the particular mechanism shown any other suitable or desired mechanism may be used. So, also, the drum A may be given an oscillatory movement instead of a complete rotation.

The drum A may be provided on its inner side within the chamber $a^5$ with lifting devices, shown as shelves $c^{10}$, by which a portion of the lower part of the mass or body of the tanbark is carried up and discharged upon the upper surface of the charge or mass of bark within the chamber, which in practice is preferably filled about two-thirds. The drum A may and preferably will be provided with a mechanical discharging apparatus for the spent or exhausted bark, which apparatus is shown as a shaft $c^{12}$, provided with right and left screws $c^{13}$ $c^{14}$, extended from the side walls or heads $a^2$ $a^4$ of the chamber $a^5$ toward the discharge opening or outlet $a^{14}$.

In operation the tanbark within the chamber $a^5$ is subjected to the action of the leaching liquor, which may be water or a weak solution of the extract and preferably to heat while the tanbark is agitated or maintained in motion, the liquor entering into the chamber $a^5$ through the perforations $a^{24}$ in the liquid-inlet pipe and percolating down through the mass of comminuted tanbark, and in practice the liquor may be admitted into the leaching-chamber in such quantity as will wholly or partially fill the space above the tanbark. The liquor extracts the tannin from the bark and the percolated liquor or extract flows or passes into the hot-well $a^6$, from which it is drawn off through the pipes $b$ $b'$ by a suitable pump $c^{20}$. (Shown in Fig. 7.) By reference to Fig. 1 it will be seen that the tanbark confined in the chamber $a^5$ and the leaching liquor therein are subject to heat in a closed chamber, which facilitates increased extraction of the tannin and avoids loss of heat and tannin matter by evaporation, thereby economizing in the cost of leaching. Furthermore, it will be noticed that the rotary motion of the drum and the shelves or lifting devices attached thereto serve to tumble or agitate the comminuted tanbark, and thus expose all particles of bark to the action of the leaching liquor, prevent the bark from packing, thereby enabling fine bark to be used, and avoid the formation of channels down through the mass of bark by the percolating liquor, which would result in an imperfect leaching, and so, also, by the tumbling aforesaid the mass of tanbark is rendered of more uniform density and a more uniform leaching is effected. When the tanbark has been exhausted of its tannin matter, the supply of steam and liquor to the chamber $a^5$ may be cut off and the motion of the drum stopped in substantially the position shown in Fig. 1, and the spent bark may be discharged through the outlet $a^{14}$, the cover being removed. This discharge may be effected, as shown, by rotation of the conveyer-shaft, which is provided with a crank $c^{30}$.

Figure 7:
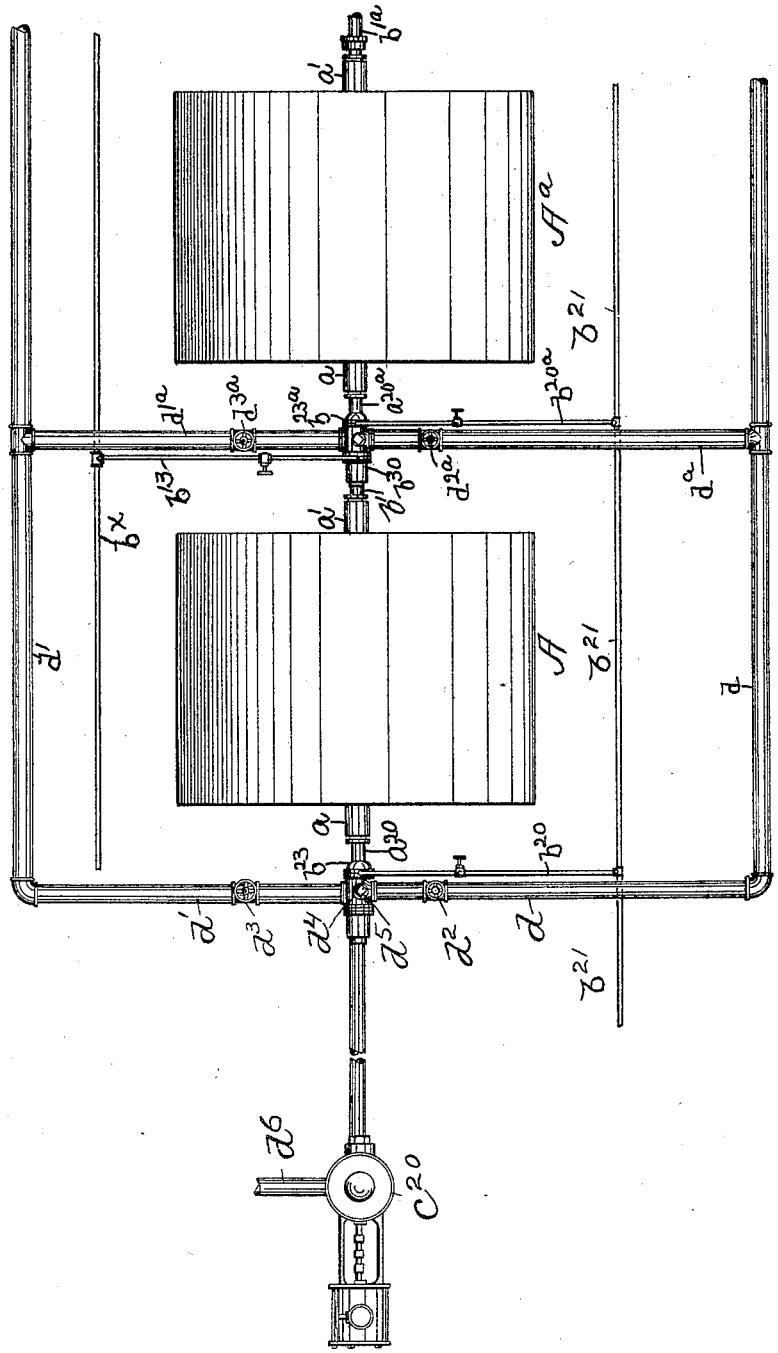

In the commercial use of the apparatus herein shown it is proposed to couple or connect up in series a plurality of the drums A after the manner shown in Fig. 7, wherein the liquor-outlet pipe for one drum may serve as the inlet to the next drum and wherein the main supply-pipe $b^{25}$ is provided with branch pipes $d\ d'$ for each drum A. The branch pipes $d\ d'$ are provided with valves $d^2\ d^3$, and the said supply and branch pipes may and preferably will be connected to a fitting $d^4$, having a three-way valve $d^5$. The outlet-pipe for the last drum in the series may be connected by a return-pipe $d^6$ to the pump $c^{20}$. To facilitate description, I have lettered the drums shown in Fig. 7 as A A$^a$ and have lettered the corresponding pipes for said drums with the affix "a" applied to the second drum.

By the system of pipe connections herein shown any one drum of the series may be cut out of circuit for purpose of repair or recharging without interrupting the flow of liquor through the remaining drums.

By means of the invention here described tanbark may be leached with a maximum extraction of tannin matter in a minimum time and at a minimum expense.

The steam-outlet pipe $b^{13}$ for each drum may be connected to a return or exhaust pipe $b^\times$.

In the practical application of the process above described tanbark has been leached in four hours, using a minimum amount of steam, whereas with the open stationary-vat process now in general commercial use from four to seven days are required, using a very large and excessive amount of steam.

The method of leaching tanbark above described is not herein claimed, as it forms the subject-matter of another application, Serial No. 686,783, filed by me July 25, 1898.

I claim—

1. In an apparatus for leaching, the combination of the following instrumentalities, viz: a rotatable normally-closed drum to contain the material to be leached, a partition-wall or false head within said drum to form a leaching-chamber and a liquor-chamber or well, means to effect communication between said chambers near the circumferential wall of the drum for the passage of the extract or percolated liquor from the leaching-chamber into the liquor-chamber, a liquid-inlet for the leaching-chamber, and a liquid-outlet for the liquor-chamber, for the purpose specified.

2. In an apparatus for leaching, the combination of the following instrumentalities, viz: a rotatable normally-closed drum to contain the material to be leached, a partition-wall or false head within said drum to form a leaching-chamber and a liquor-chamber or well, means to effect communication between said chambers near the circumferential wall of the drum for the passage of the extract from the leaching-chamber to the liquor-chamber, a liquid-inlet for the leaching-chamber to admit liquor therein while the drum is in motion, a liquid-outlet for the liquor-chamber, and a heating apparatus within the said drum, for the purpose specified.

3. In an apparatus for leaching, the combination of the following instrumentalities, viz: a rotatable normally-closed drum to contain the material to be leached, a partition-wall or false head within said drum to form a leaching-chamber, and a liquor-chamber or well, means to effect communication between said chambers for the passage of the extract from the leaching-chamber into the liquor-chamber, a liquid-inlet for the leaching-chamber, a liquid-outlet for the liquor-chamber having a depending leg extended to near the bottom of said liquor-chamber, and a pressure-equalizing vent communicating with said liquor-outlet, substantially as described.

4. In an apparatus for leaching, the combination of the following instrumentalities, viz: a rotatable drum provided with an inlet-opening for the material to be leached, a partition-wall within said drum forming a leaching-chamber and a liquor-chamber or well, a strainer interposed between said chambers near the circumference of the drum, a liquid-inlet for the leaching-chamber, and a liquor-outlet for the liquor-chamber, substantially as and for the purpose specified.

5. In an apparatus for leaching, the combination of the following instrumentalities, viz: a rotatable normally-closed drum provided with a leaching-chamber to contain the material to be leached and with a liquor-chamber in communication with the leaching-chamber near the circumferential wall of the drum for the passage of the extract from the leaching-chamber into said liquor-chamber, substantially as described.

6. In an apparatus for leaching, the combination of the following instrumentalities, viz: a rotatable normally-closed drum to contain the material to be leached, a liquid-inlet for said drum, an outlet for the extract liquor, and a strainer interposed between said inlet and outlet near the circumferential wall of the drum to permit of the passage of the extract liquor and prevent the passage of the said material into the said outlet, substantially as described.

7. In an apparatus for leaching, the combination of the following instrumentalities, viz: a rotatable normally-closed drum to contain the material to be leached, and provided with means within it for lifting a portion of the said material, a liquid-inlet for said drum, an outlet for the extract liquor, and a strainer interposed between said inlet and outlet near the circumferential wall of the drum, for the purpose specified.

8. In an apparatus for leaching, the combination of the following instrumentalities, viz: a rotatable normally-closed drum to contain the material to be leached, and provided with means within it for lifting a portion of the said material, a liquid-inlet for said drum, an outlet for the extract liquor, a strainer interposed between said inlet and outlet near the circumferential wall of the drum, and a heating apparatus within said drum for the passage of the heating medium through the drum out of contact with the material to be leached, substantially as described.

9. In an apparatus for leaching, the combination of the following instrumentalities, viz: a rotatable normally-closed drum provided with a leaching-chamber and with a liquor or extract chamber, a liquid-inlet communicating with the leaching-chamber, a liquor-outlet for said extract-chamber having a depending leg and a pressure-equalizing vent within said extract-chamber, and means to heat the leaching liquid and the said material, substantially as described.

10. In an apparatus for leaching, the combination of the following instrumentalities, viz: a rotatable normally-closed drum to contain the material to be leached, a liquid-inlet for said drum, a stationary outlet-pipe for the extract or percolated liquor having a leg within the drum extended to near the circumferential wall of the drum, and a strainer interposed between said liquid-inlet and the leg of said extract-outlet pipe, for the purpose specified.

11. In an apparatus for leaching, the combination of the following instrumentalities, viz: a rotatable normally-closed drum to contain the material to be leached, a lifting device attached to said drum on its inner side, a heating apparatus within the drum, a liquid-inlet, and a liquid-outlet for said drum, and a strainer interposed between said inlet and outlet near the circumferential wall of the drum, to cause the liquid admitted into the drum to percolate through the mass of material before passing out of the drum, substantially as and for the purpose specified.

In testimony whereof I have signed my name to this specification in the presence of two subscribing witnesses.

GEORGE C. VAUGHN.

Witnesses:
JAS. H. CHURCHILL,
J. MURPHY.